United States Patent
Mei et al.

(10) Patent No.: US 10,769,378 B2
(45) Date of Patent: Sep. 8, 2020

(54) EXTENDING SYSTEM ENTITIES FOR CONVERSATIONAL SYSTEM

(71) Applicant: INTERNATIONAL BUSINESS MACHINES CORPORATION, Armonk, NY (US)

(72) Inventors: Li Jun Mei, Beijing (CN); Qi Cheng Li, Beijing (CN); Rangachari Anand, Teaneck, NJ (US); Ajay Gupta, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 108 days.

(21) Appl. No.: 16/190,581

(22) Filed: Nov. 14, 2018

(65) Prior Publication Data

US 2020/0151247 A1    May 14, 2020

(51) Int. Cl.
| | |
|---|---|
| *G10L 15/22* | (2006.01) |
| *G06F 40/30* | (2020.01) |
| *G06F 16/00* | (2019.01) |
| *G06F 40/295* | (2020.01) |
| *G06N 5/04* | (2006.01) |
| *G06N 20/00* | (2019.01) |
| *G06F 16/2458* | (2019.01) |

(52) U.S. Cl.
CPC ........ *G06F 40/295* (2020.01); *G06F 16/2465* (2019.01); *G06F 40/30* (2020.01); *G06N 5/04* (2013.01); *G06N 20/00* (2019.01)

(58) Field of Classification Search
CPC ........... G06F 16/00; G06F 40/30; G10L 15/22
See application file for complete search history.

(56) References Cited

U.S. PATENT DOCUMENTS

| | | | |
|---|---|---|---|
| 8,594,996 B2 | 11/2013 | Liang et al. | |
| 2014/0280197 A1* | 9/2014 | Gatto | G06F 11/3476 707/741 |
| 2016/0342702 A1 | 11/2016 | Barve et al. | |
| 2017/0092264 A1 | 3/2017 | Hakkani-Tur et al. | |
| 2017/0161335 A1* | 6/2017 | Akula | G06F 16/9024 |
| 2017/0169115 A1* | 6/2017 | Shen | G06F 16/90332 |
| 2018/0232345 A1 | 8/2018 | Finkelstein et al. | |
| 2018/0232355 A1 | 8/2018 | Dunne et al. | |
| 2018/0278740 A1* | 9/2018 | Choi | H04M 1/72522 |
| 2019/0324780 A1* | 10/2019 | Zhu | G06F 3/167 |
| 2020/0066255 A1* | 2/2020 | Madan | G06F 40/30 |

OTHER PUBLICATIONS

Sarikaya et al., An Overview of End-to-End Language Understanding and Dialog Management for Personal Digital Assistants, GlobalSIP 2016, Dec. 2016, pp. 391-397.
Tur et al., "The CALO Meeting Assistant System", IEEE Transactions on Audio, Speech, and Language Processing, Aug. 2010, pp. 1601-1611, vol. 18, No. 6.

* cited by examiner

*Primary Examiner* — Shreyans A Patel
(74) *Attorney, Agent, or Firm* — Tutunjian & Bitetto, P.C.; Joseph Petrokaitis

(57) ABSTRACT

A computer-implemented method is provided for processing a set D of conversation logs. The method includes learning, by a processor device, a set R of entity relation mining rules from a set K of known entity utterances uttered by known entities. The method further includes automatically recommending, by the processor device, extended utterances of the known entities from unrecognized ones of the known entities based on the set R.

20 Claims, 11 Drawing Sheets

EXTENDING SYSTEM ENTITIES FOR CONVERSATIONAL SYSTEM

BACKGROUND

Technical Field

The present invention generally relates to user interfacing, and more particularly to extending system entities for a conversational system.

Description of the Related Art

For conversation service providers, it is important to provide system entities. As used herein, the terms "entity" and "system entity" interchangeably refer to information in a user input that is relevant to the user's purpose. Moreover, as used herein, the term "intent" refers to a purpose or goal expressed in a user input, such as answering a question or processing a bill payment. Hence, if intents represent verbs (the action a user wants to do), entities represent nouns (the object of, or the context for, that action). For example, when the intent is to get a weather forecast, the relevant location and date entities are required before the application can return an accurate forecast. While it can be relatively easy to list some utterances for one entity, it is much more difficult to list all utterances for all entities at one time. Exemplary numeric entities can include, for example, but are not limited to, date, time, currency, percentage, and number. Currently, there is no existing approach available to extend utterances of the same system entity. Accordingly, an approach is needed to extend utterances of the same system entity.

SUMMARY

According to an aspect of the present invention, a computer-implemented method is provided for processing a set D of conversation logs. The method includes learning, by a processor device, a set R of entity relation mining rules from a set K of known entity utterances uttered by known entities. The method further includes automatically recommending, by the processor device, extended utterances of the known entities from unrecognized ones of the known entities based on the set R. The learning step includes replacing, in the set D of conversation logs, any of the known entity utterances from the set K that appear in the set D, by a respective representative utterance having a same meaning to form a set $D_1$ of unified conversation logs. The learning step further includes finding a set CS of chat log segments in the set $D_1$ which include at least two of the same utterances in the set $D_1$. The learning step also includes generating the set R of entity relation mining rules based on the set CS. The learning step additionally includes randomly selecting a subset $K_1$ from the set K. For each of the respective representative utterance in the set $D_1$ that also occurs in the subset $K_1$, the learning step further includes replacing the respective representative utterance with a corresponding original utterance from the set D to form a list $D_2$ of conversation logs. The learning step also includes removing the subset $K_1$ from the set K. For each individual rule r in the set R, the learning step additionally includes applying the individual rule r on the list $D_2$, checking a success rate of identifying utterance relations in the subset $K_1$, and removing the individual rule r from the set R if the success rate is below a rule success rate threshold.

According to another aspect of the present invention, a computer program product is provided for processing a set D of conversation logs. The computer program product includes a non-transitory computer readable storage medium having program instructions embodied therewith. The program instructions are executable by a computer to cause the computer to perform a method. The method includes learning, by a processor device, a set R of entity relation mining rules from a set K of known entity utterances uttered by known entities. The method further includes automatically recommending, by the processor device, extended utterances of the known entities from unrecognized ones of the known entities based on the set R. The learning step includes replacing, in the set D of conversation logs, any of the known entity utterances from the set K that appear in the set D, by a respective representative utterance having a same meaning to form a set $D_1$ of unified conversation logs. The learning step further includes finding a set CS of chat log segments in the set $D_1$ which include at least two of the same utterances in the set $D_1$. The learning step also includes generating the set R of entity relation mining rules based on the set CS. The learning step additionally includes randomly selecting a subset $K_1$ from the set K. For each of the respective representative utterance in the set $D_1$ that also occurs in the subset $K_1$, the learning step further includes replacing the respective representative utterance with a corresponding original utterance from the set D to form a list $D_2$ of conversation logs. The learning step also includes removing the subset $K_1$ from the set K. For each individual rule r in the set R, the learning step additionally includes applying the individual rule r on the list $D_2$, checking a success rate of identifying utterance relations in the subset $K_1$, and removing the individual rule r from the set R if the success rate is below a rule success rate threshold.

According to yet another aspect of the present invention, a computer processing system is provided for processing a set D of conversation logs. The computer processing system includes a memory for storing program code. The computer processing system further includes a processor device for running the program code to learn a set R of entity relation mining rules from a set K of known entity utterances uttered by known entities. The processor device further runs the program code to automatically recommend extended utterances of the known entities from unrecognized ones of the known entities based on the set R. The set R is learned by replacing, in the set D of conversation logs, any of the known entity utterances from the set K that appear in the set D, by a respective representative utterance having a same meaning to form a set $D_1$ of unified conversation logs. The set R is further learned by finding a set CS of chat log segments in the set $D_1$ which include at least two of the same utterances in the set $D_1$. The set R is also learned by generating the set R of entity relation mining rules based on the set CS. The set R is additionally learned by randomly selecting a subset $K_1$ from the set K. For each of the respective representative utterance in the set $D_1$ that also occurs in the subset $K_1$, the set R is further learned by replacing the respective representative utterance with a corresponding original utterance from the set D to form a list $D_2$ of conversation logs. The set R is also learned by removing the subset $K_1$ from the set K. For each individual rule r in the set R, the set R is additionally learned applying the individual rule r on the list $D_2$, checking a success rate of identifying utterance relations in the subset $K_1$, and removing the individual rule r from the set R if the success rate is below a rule success rate threshold.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to extending system entities for a conversational system. "System entities", or "entities" in short, refer to information in a user input that is relevant to the user's purpose.

In an embodiment, the present invention can use known entity utterances to learn entity relation mining rules and then automatically recommend unrecognized entities that are actually extended utterances of known entities.

In an embodiment, the present invention can use word/phrase embedding to achieve distributed representation vectors for both known and unknown entities. With such embedding vectors, candidates of word/phrase utterance extension with similar embedding vectors can be identified. The identified candidates can then be ranked using character-level similarity.

In an embodiment, candidates can be checked to see if they match any rule in a set of rules. If a match is detected, then the candidate can be recommended to SME for verification. If not match is detected, then the candidate can be abandoned (not used).

Figure 1:
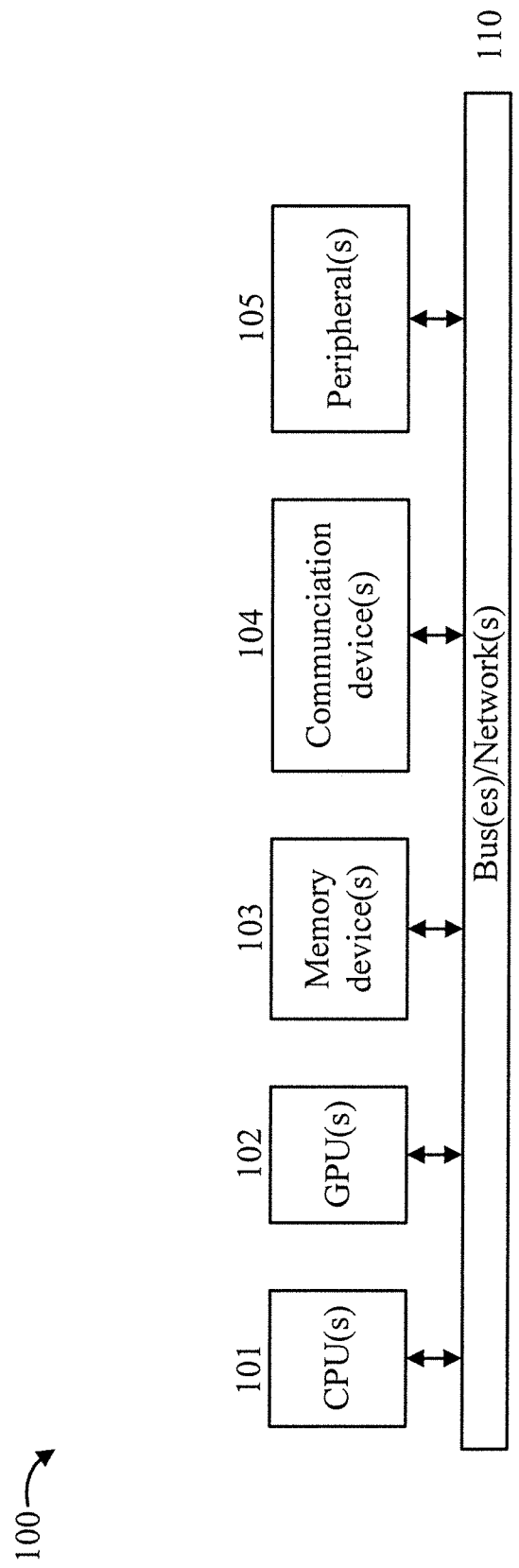
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 10-11). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes a conversational system operatively coupled to a controlled system, while the environment 300 includes a conversational system as part of a controlled system. Moreover, any of environments 200 and 300 can be part of a cloud-based environment (e.g., see FIGS. 10 and 11). These and other environments to which the present invention can be applied are readily determined by one of ordinary skill in the art, given the teachings of the present invention provided herein, while maintaining the spirit of the present invention.

Figure 2:
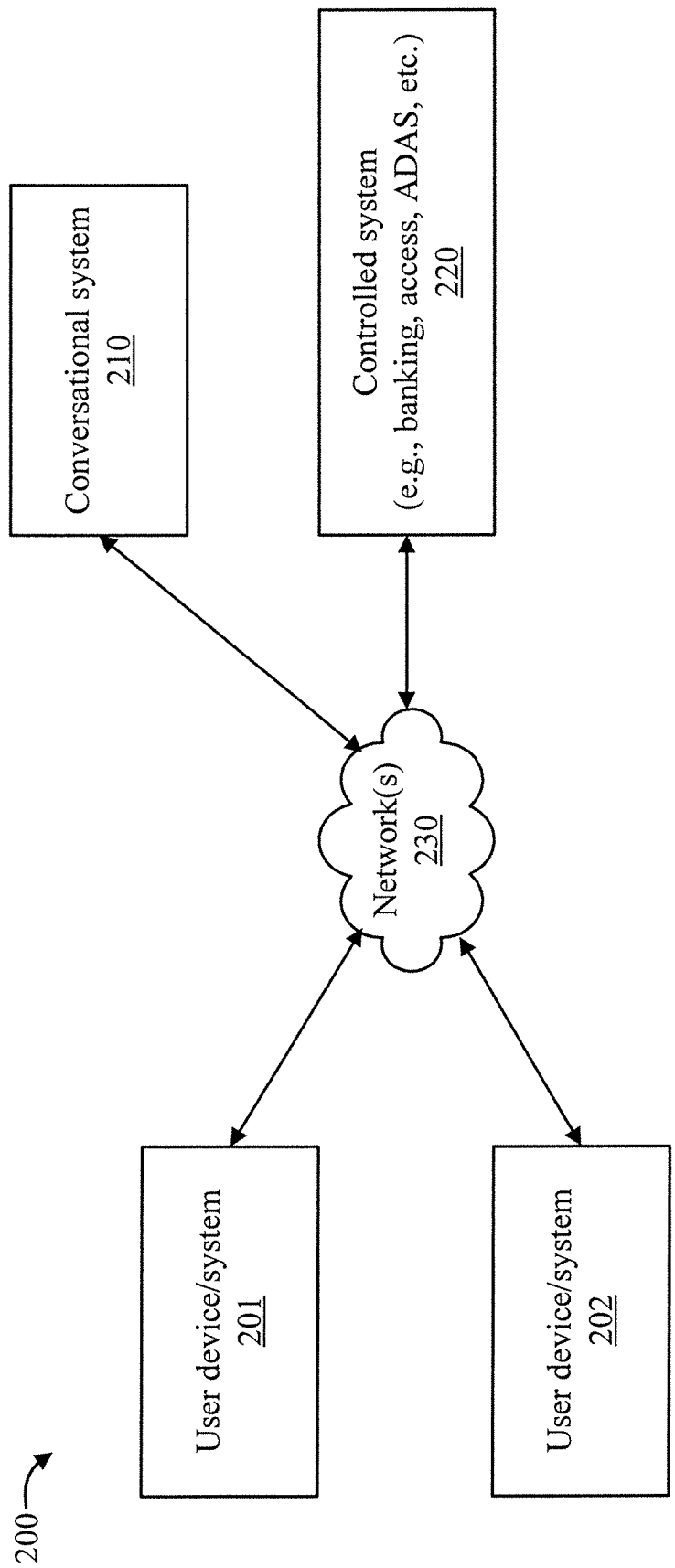
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a user device/system 201, a user device/system 202, a conversational system 210 and a controlled system 220. The user device/system 201, the user device/system 202, conversational system 210 and the controlled system 220 are configured to enable communications therebetween. For example, transceivers and/or other types of communication devices including wireless, wired, and combinations thereof can be used. In an embodiment, communication between can be performed over one or more networks, collectively denoted by the figure reference numeral 230. The user devices/systems 201 and 202 can be any type of system allowing for conversation between a user and another entity, where the other entity can be a machine or another person. For example, the user devices/systems 201 and 202, which can be the same type or different types, can be implemented by smart phones, tablets, laptops, desktop computers, and so forth. The controlled system 220 can be any type of processor-based system such as, for example, but not limited to, a banking system, an access system, an Advanced Driver-Assistance System (ADAS), and so forth.

In an embodiment, the two user devices/systems 201 and 202 are envisioned as being used by two respective users in order to facilitate a conversation therebetween. While 2 user devices/systems 201 and 202 are shown, any number of user devices/systems can be involved such as the case in 3 way or more conversations. In such cases, the conversational system 210 may be used to monitor such conversations in order to extend system entities for the conversations. Moreover, while 2 user devices/systems 201 and 202 are shown, in an embodiment, a user using one of the 2 user devices/systems 201 and 202 may converse with a machine, implemented by any of the conversational system 210 and/or the controlled system 220. For example, an embodiment of the present invention can be used in a customer service environment, where the controlled system is purchase, scheduling, and/or delivery system. These and other variations and implementations of the elements of FIG. 2 are readily determined by one of ordinary skill in the art given the teachings of the present invention provided herein, while maintaining the spirit of the present invention.

The controlled system 220 can be controlled based on an answer provided to the conversational system 210 or an extended answer determined by the conversational system 210. These two types of answers are interchangeably referred to as "answer" in short. Based on an answer from the conversational system 210, a corresponding action (e.g., power down machine, and/or so forth) can be performed. As an example, based on a user utterance, a banking application be invoked, and one or more specific banking actions can then be performed. As another example, based on an answer from the conversational system, an ADAS may engage/disengage autopilot mode, or may involve some other vehicle feature such as locking/unlocking the doors upon entry/exit in/from the vehicle, enabling/disabling cruise control, and so forth. As yet another example, a door or object (computer) can be unlocked responsive to a user answer (that is configured as a password or verification for access). It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the conversational system 210 can be implemented as a node in a cloud-computing arrangement. In an embodiment, a single conversational system 210 can be assigned to a single controlled system or to multiple controlled systems. These and other configurations of the elements of environment 200 are readily determined by one of ordinary skill in the art given the teachings of the present invention provided herein, while maintaining the spirit of the present invention.

Figure 3:
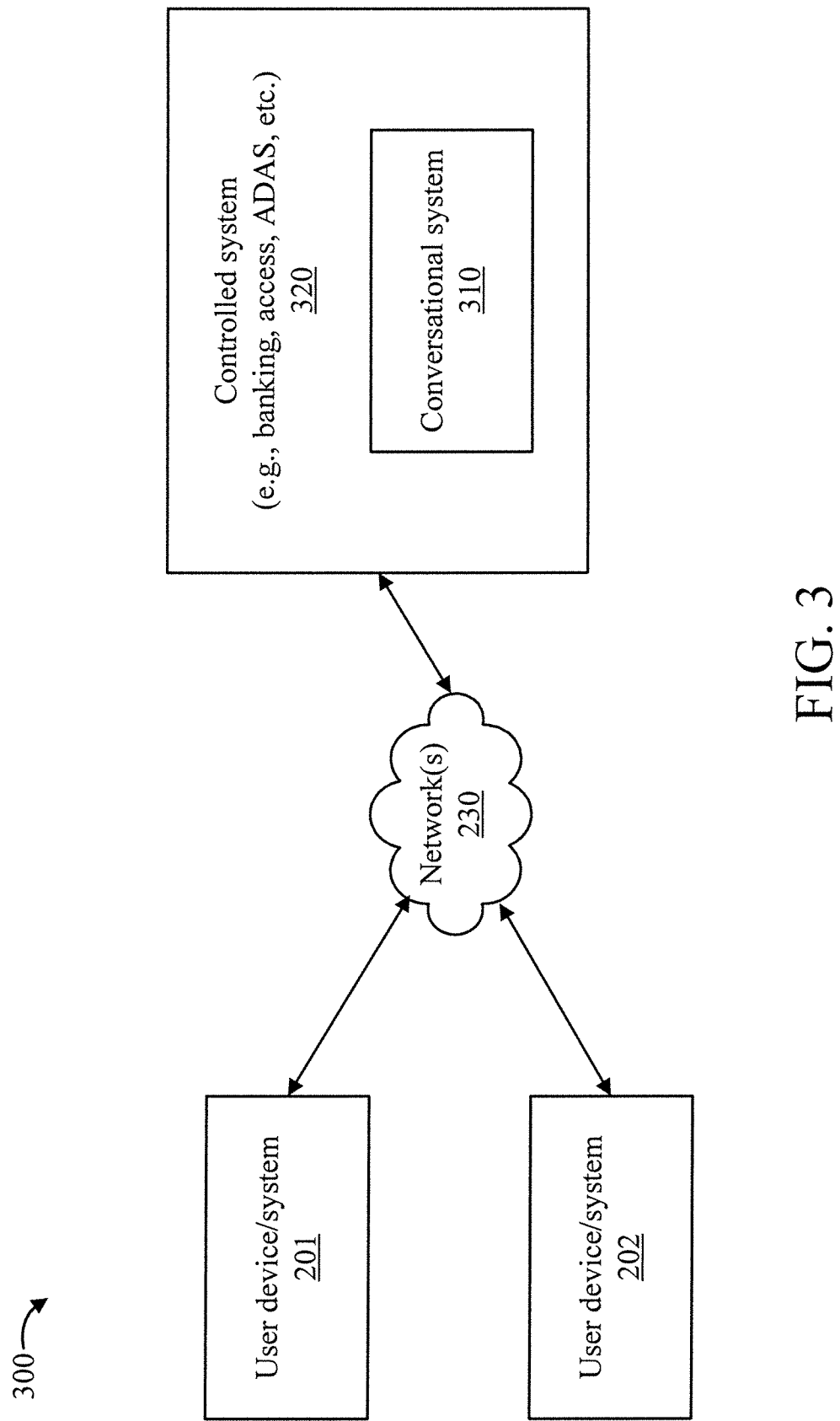
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a user device/system 301, a user device/system 302, a controlled system 320 that, in turn, includes a conversational system 310. One or more communication buses and/or other devices can be used to facilitate inter-system, as well as intra-system, communication. The user devices/systems 201 and 202 can be any type of system allowing for conversation between a user and another entity, where the other entity can be a machine or another person. Moreover, the conversation can be between more than 2 parties, depending upon the implementation. The controlled system 320 can be any type of processor-based system such as, for example, but not limited to, a banking system, an access system, an Advanced Driver-Assistance System (ADAS), and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300. The same applies to elements 301 and 302, given the descriptions above relating to elements 201 and 202, respectively.

Figure 4:
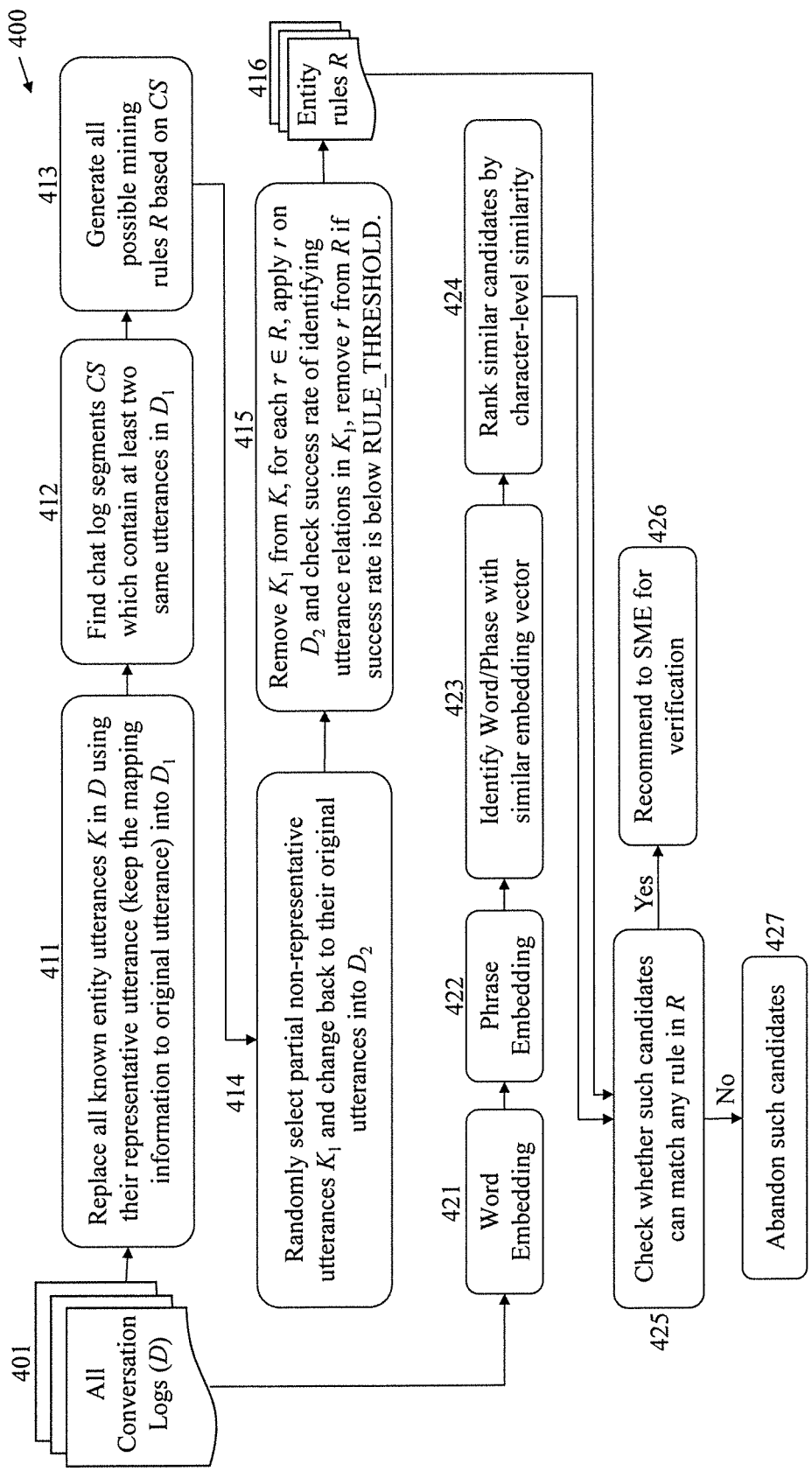
FIG. 4 is a high-level block diagram showing an exemplary architecture, in accordance with an embodiment of the present invention.

FIG. 4 is a high-level block diagram showing an exemplary architecture 400, in accordance with an embodiment of the present invention.

At block 401, input conversation logs D.

At block 411, replace all known entity utterances K in all of the conversation logs D by their representative utterance (keep the mapping information to the original utterance) to form a set of unified conversation logs $D_1$. As used herein, "representative utterance" refers to an utterance selected from a set S of utterances which have the same meaning (e.g., those utterances who all indicate the city New York). Such set S of utterances can be pre-defined by a human or by machine, and the representative utterance can be the first utterance in the set. $D_1$ represents processed conversation logs in which all utterances having the same meaning are replaced by the corresponding representative utterance (it can be considered as unified processing for the original conversation logs D). As in block 414, we will change some of the unified entity utterances back to their original utterance, thus we need to keep the mapping information in order to go back to the original utterance.

At block 412, find chat log segments CS from unified conversation logs $D_1$, which include at least two of the same utterances in $D_1$.

At block 413, generate all possible mining rules R based on CS.

At block 414, randomly select a subset $K_1$ from K, and for each representative utterance in $D_1$, if this representative utterance is also in $K_1$, then replace such representative utterance with a corresponding original utterance (note that most of them should be non-representative utterances). Therefore, compared to $D_1$, $D_2$ is the list of conversation logs in which partial entity utterances have been changed back their original utterances.

At block 415, remove $K_1$ from K, for each r ∈ R, apply r on $D_2$ and check success rate of identifying utterance relations in $K_1$, remove r from R if success rate is below RULE_THRESHOLD. R denotes a set of entity rules, and r denotes a particular rule in the set R.

At block 416, output the set of entity rules R.

At block 421, generate a set of word embeddings from the conversation logs D. The set of word embeddings include embedding vectors that map words appearing in the conversational logs D to real numbers.

At block 422, generate a set of phrase embeddings from the set of word embeddings. The set of phrase embeddings include embedding vectors that map phrases appearing in the conversational logs D to real numbers.

At block 423, identify words/phrases with similar embedding vectors. Similarity can be relative to a threshold (e.g., certain number of same digits, etc.).

At block 424, rank similar (word and/or phrase) candidates by character-level similarity.

At block 425, check whether any of the similar candidates match any rule in the set of rules R. If so, then proceed to block 426. Otherwise, proceed to block 427.

At block 426, recommend to a Subject Matter Expert (SME) for verification. These candidate words and phrases are recommended to a user as extended utterances of the known entities.

At block 427, abandon the similar candidates.

Hence, using architecture 400, known entity utterances are used for learning entity relation mining rules. Unrecognized entities, which are actually extended utterances of known entities, can be automatically recommended to a user.

Also, using architecture 400, word embeddings (per block 421) and phrase embeddings (per block 422) are used to obtain distributed representation vectors for both known and unknown entities. With such embedding vectors, candidate of the word/phase utterance extensions with similar embedding vectors are identified (per block 423) and ranked (per block 424) based on character-level similarity.

Additionally, using architecture 400, it is checked (per block 425) whether such candidates match any rule in a set of rules. If so, then the matching candidates will be automatically recommended to SME for verification (per block 426). Otherwise, the candidates will be abandoned (per block 427).

Figure 5:
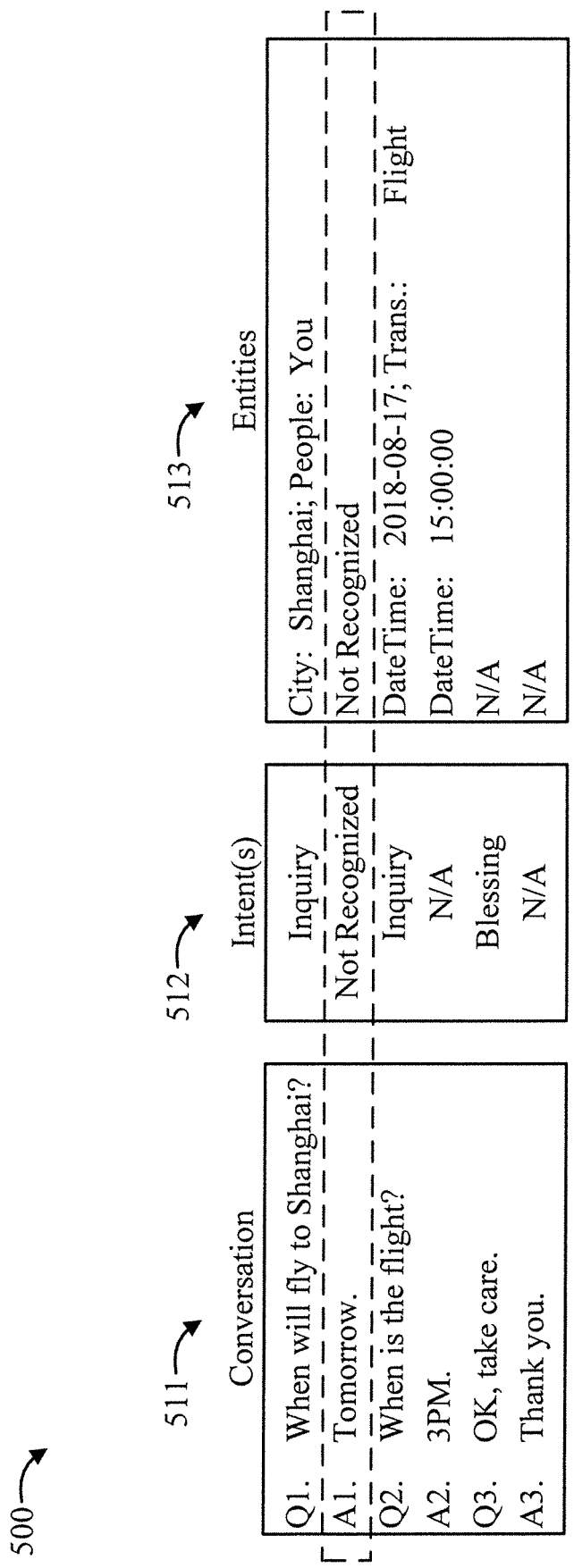
FIG. 5 is a diagram showing an exemplary conversation to which the present invention can be applied, in accordance with an embodiment of the present invention.

FIG. 5 is a diagram showing an exemplary conversation 500 to which the present invention can be applied, in accordance with an embodiment of the present invention.

Regarding the conversation 500, the following are the involved current system entities:
1. City: Shanghai
2. People: you, he, I
3. Date time: today, tomorrow (Utterance B), the day after tomorrow, 10 AM, 3 P.M., . . .
4. Transportation (Trans.): plane, railway, car, subway The conversation 500 can be a human-to-human conversation or a human-to-machine conversation, depending upon the implementation.

Table 510 shows the utterances 511 of the conversation 500, the intent 512 of the utterances 511, and the entities 513 involved in the utterances 511. The utterances 511 include multiple questions and multiple answers. Each of the questions is preceded by the letter "Q" followed by an integer indicating the question number, and each of the answers is preceded by the letter "A" followed by an integer indicating the answer number. In particular, there are 3 questions, namely Q1, Q2, and Q3, and 3 answers, namely A1, A2, and A3.

As can be seen in FIG. 5, the intent 512 of the answer A1 to, as well as the entity 513 involved in, the question Q1 "When will fly to Shanghai?", are not recognized.

In this scenario, a problem exists in how to infer the answer A2 to be an extended utterance of A1.

Figure 6:
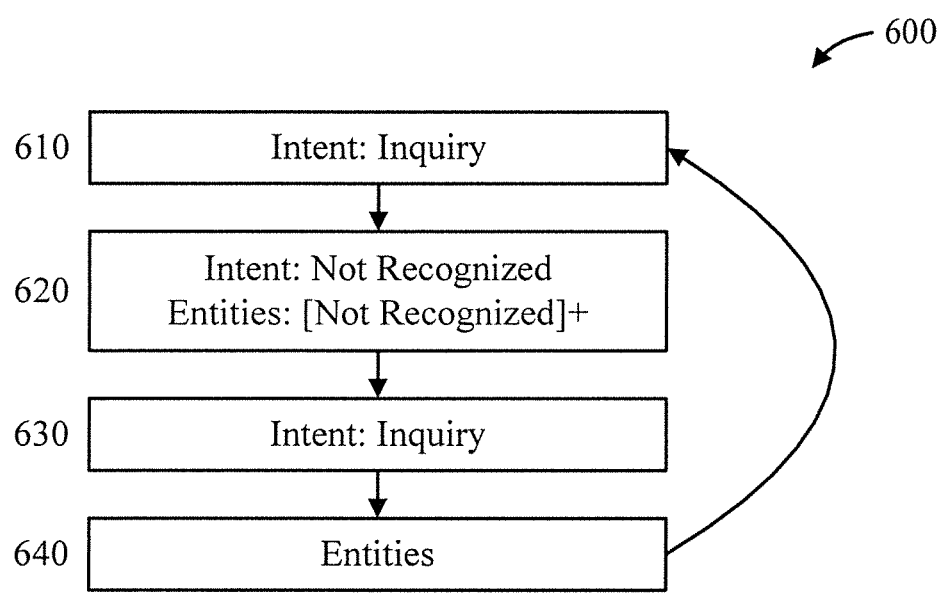
FIG. 6 is a flow diagram showing an exemplary entity relation mining, in accordance with an embodiment of the present invention.
Figure 7:
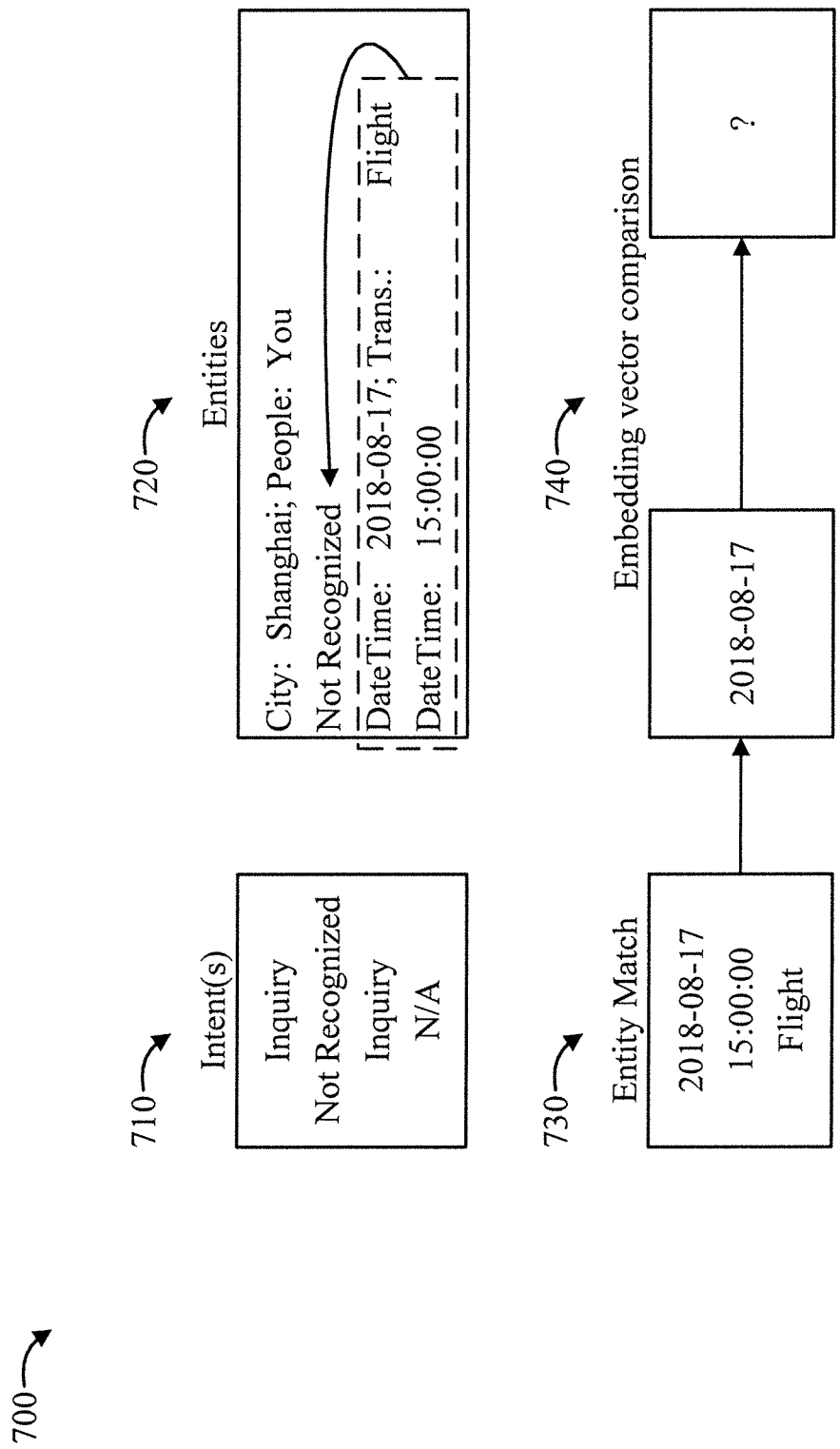
FIG. 7 is a block diagram showing intents, entities, an entity match, and an embedding vector comparison, each relating to the entity relation mining of FIG. 6, in accordance with an embodiment of the present invention.

FIG. 6 is a flow diagram showing an exemplary entity relation mining 600, in accordance with an embodiment of the present invention. FIG. 7 is a block diagram showing intents 710, entities 720, an entity match 730, and an embedding vector comparison 740, each relating to the entity relation mining 600 of FIG. 6, in accordance with an embodiment of the present invention.

At block 610, the system recognizes the intent of the user input is "inquiry".

At block 620, the system does not recognize the intent of the user input, identifies a few potential entity candidates, but cannot recognize the detailed entity types.

At block 630, the system recognizes the intent of the user input is "inquiry".

At block 640, the system recognizes a set of entities from the user input.

Figure 8:
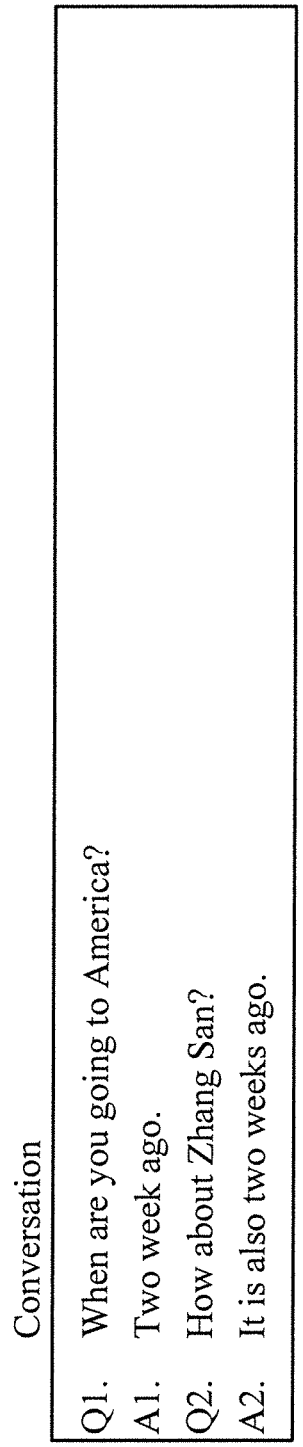
FIG. 8 is a diagram showing another exemplary conversation to which the present invention can be applied, in accordance with an embodiment of the present invention.

FIG. 8 is a diagram showing another exemplary conversation 800 to which the present invention can be applied, in accordance with an embodiment of the present invention.

Each of the questions is preceded by the letter "Q" followed by an integer indicating the question number, and each of the answers is preceded by the letter "A" followed by an integer indicating the answer number. In particular, there are 2 questions, namely Q1 and Q2, and 2 answers, namely A1 and A2.

Figure 9:
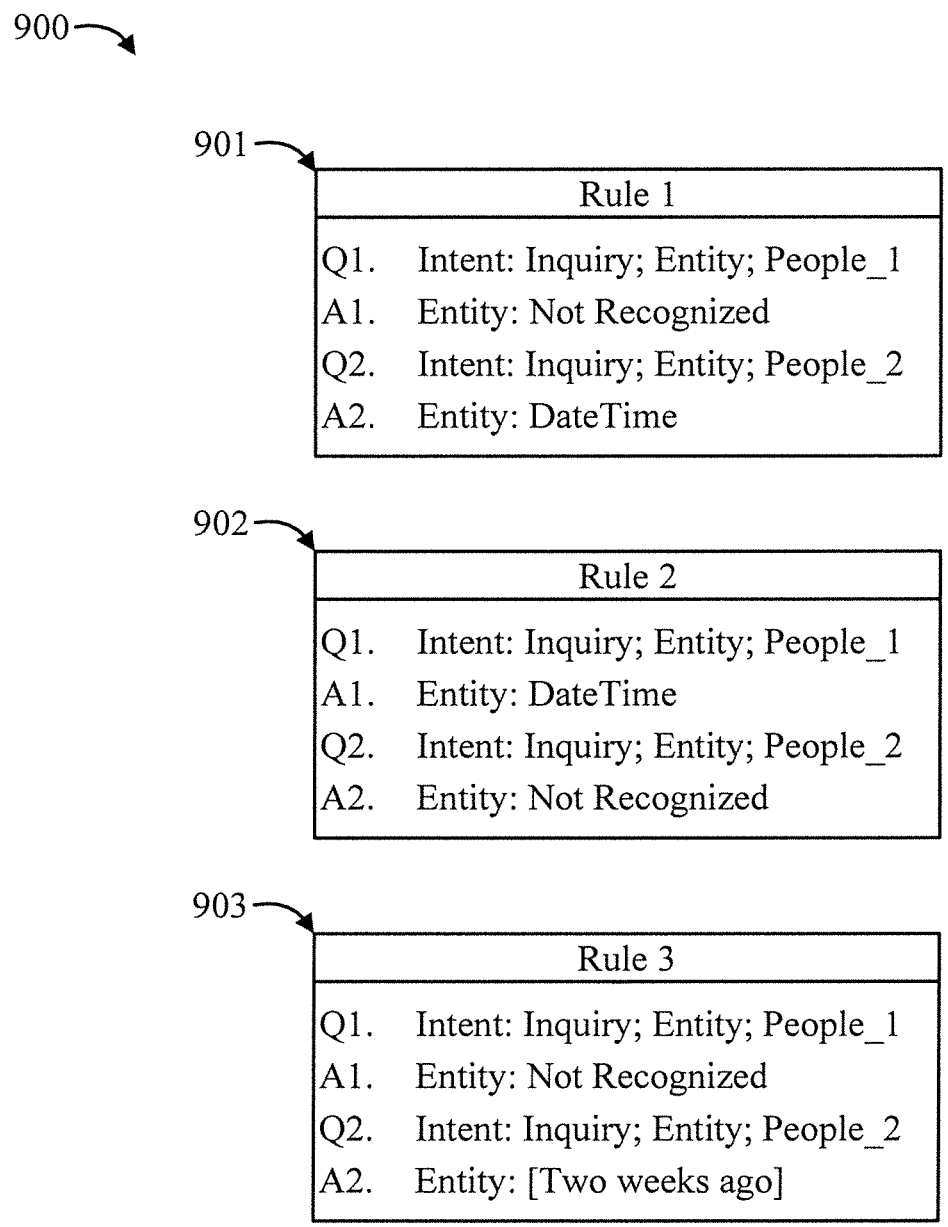
FIG. 9 is a diagram showing three exemplary rules relating to conversation, in accordance with an embodiment of the present invention.

FIG. 9 is a diagram showing three exemplary rules relating to conversation 800, in accordance with an embodiment of the present invention. The 3 exemplary rules, namely rule-1 901, rule-2 902, and rule-3 903, pertain to the questions Q1 and Q2 and answers A1 and A2.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
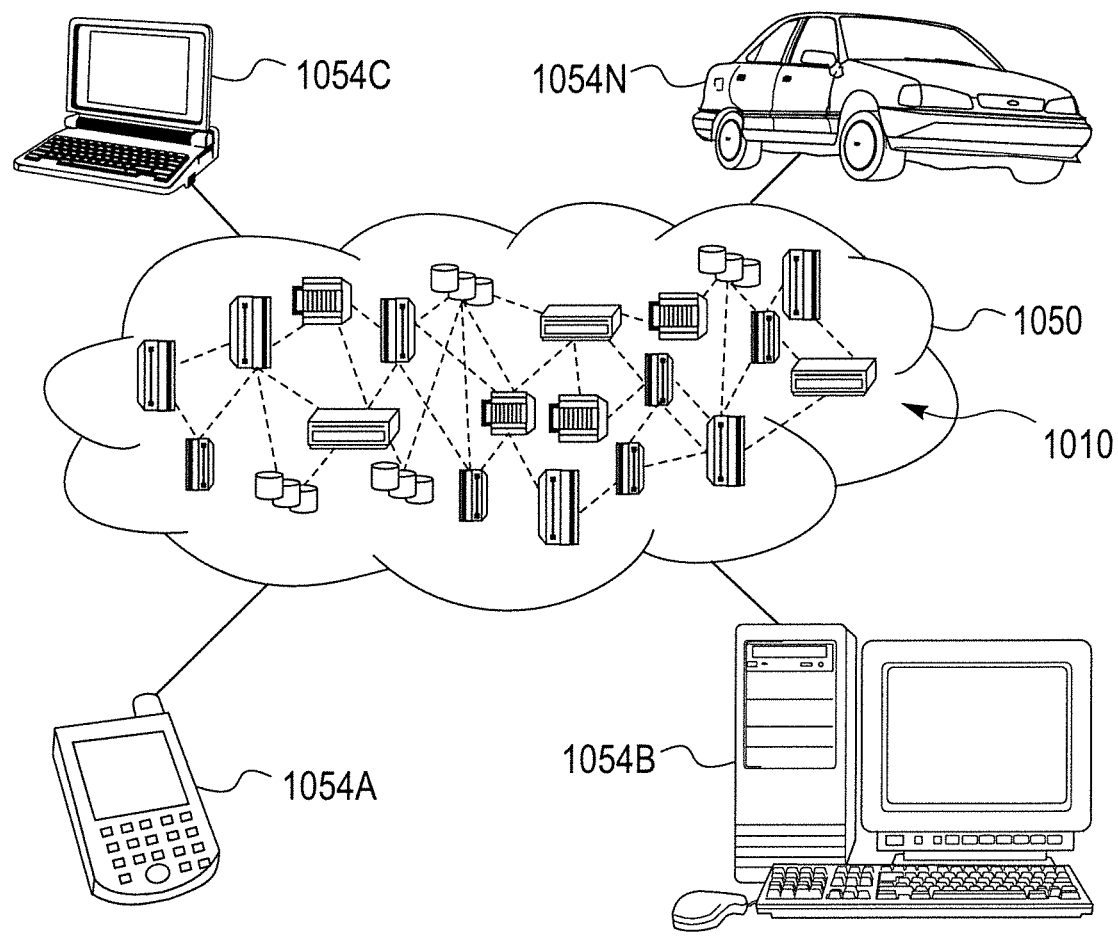
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
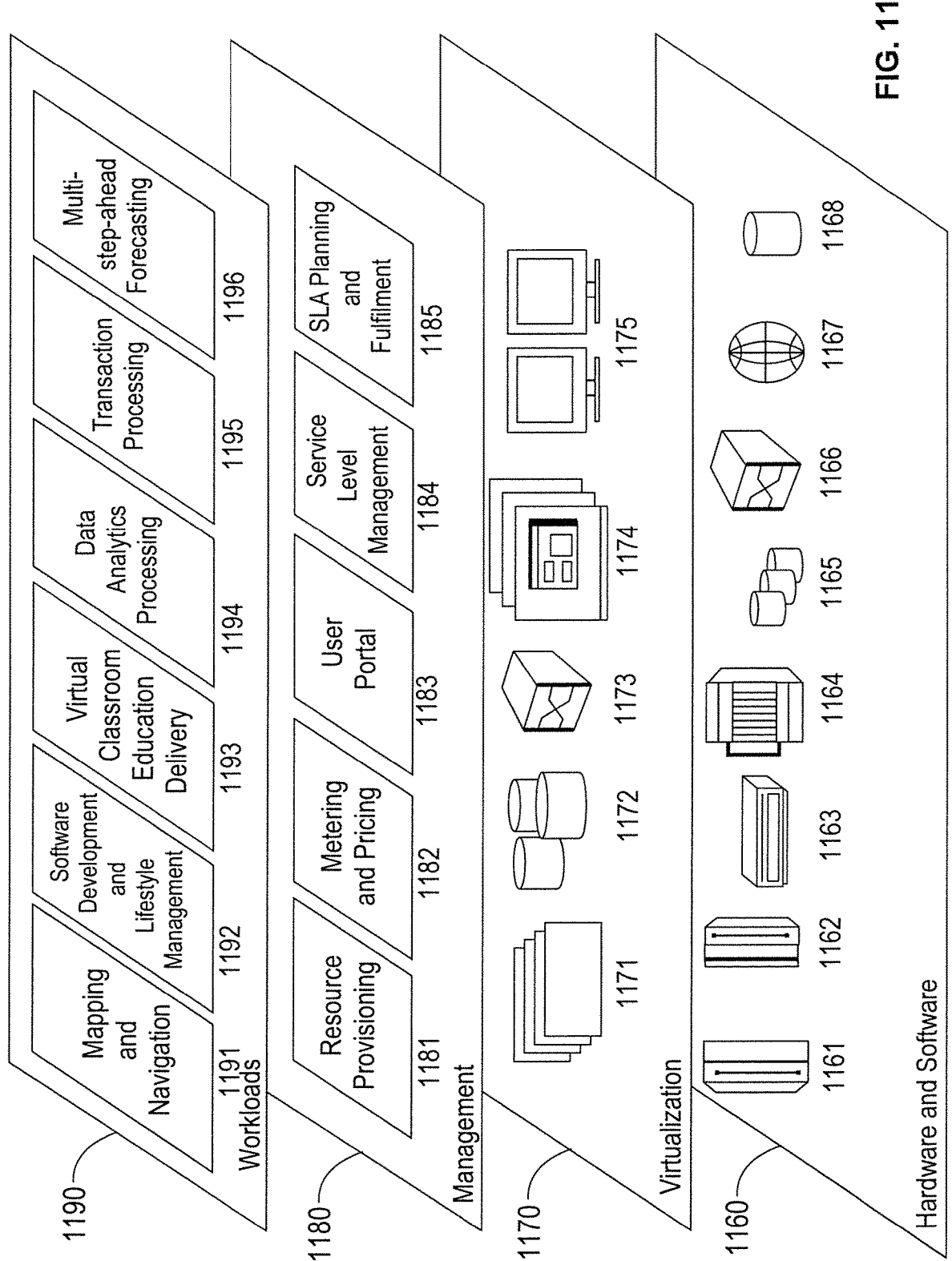
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and extending system entities for a conversational system 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for processing a set D of conversation logs, comprising:
    learning, by a processor device, a set R of entity relation mining rules from a set K of known entity utterances uttered by known entities; and
    automatically recommending, by the processor device, extended utterances of the known entities from unrecognized ones of the known entities based on the set R;
    wherein said learning step comprises:
        replacing, in the set D of conversation logs, any of the known entity utterances from the set K that appear in the set D, by a respective representative utterance having a same meaning to form a set $D_1$ of unified conversation logs;
        finding a set CS of chat log segments in the set $D_1$ which include at least two of the same utterances in the set $D_1$;
        generating the set R of entity relation mining rules based on the set CS;
        randomly selecting a subset $K_1$ from the set K;
        for each of the respective representative utterance in the set $D_1$ that also occurs in the subset $K_1$, replacing the respective representative utterance with a corresponding original utterance from the set D to form a list $D_2$ of conversation logs;
        removing the subset $K_1$ from the set K; and
        for each individual rule r in the set R, applying the individual rule r on the list $D_2$, checking a success rate of identifying utterance relations in the subset $K_1$, and removing the individual rule r from the set R if the success rate is below a rule success rate threshold.

2. The computer-implemented method of claim 1, wherein said first replacing step comprises maintaining mapping information between each of the known entity utterances from the set K and the respective representative utterance therefor, and wherein said second replacing step replaces the respective representative utterance with the corresponding original utterance from the set D using the mapping information to form the list $D_2$.

3. The computer-implemented method of claim 1, wherein the respective representative utterance having the same meaning is comprised in a set S of respective representative utterances having same meanings to expected words in the set D.

4. The computer-implemented method of claim 1, wherein said recommending step comprises:
    generating a set of word embeddings from the set D;
    generating a set of phrase embeddings from the set of word embeddings;
    identifying words and phrases having similar embedding vectors relative to a similarity threshold;
    ranking candidate words and phrases based on character-level similarity; and
    recommending at least some of the candidate words and phrases as the extended utterances.

5. The computer-implemented method of claim 4, further comprising:
    determining whether any of the candidate words and phrases match any of the rules in the set R;
    recommending matching ones of the candidate words and phrases to a subject matter expert for verification; and
    discarding non-matching ones of the candidate words and phrases.

6. The computer-implemented method of claim 4, wherein the word embedding and the phrase embeddings are used to obtain distributed representation vectors for both the known entities and unknown entities.

7. The computer-implemented method of claim 1, wherein the set R is learned relative to a particular task, and wherein the known entity utterances specifically relate to the particular task.

8. The computer-implemented method of claim 1, further comprising controlling a processor-based machine to perform an action responsive to the extended utterance.

9. The computer-implemented method of claim 8, wherein the processor-based machine is an Advanced Driver-Assistance System, and the extended utterance relates to controlling a trajectory of a vehicle.

10. The computer-implemented method of claim 1, wherein the method is provided as a cloud-based service.

11. A computer program product for processing a set D of conversation logs, the computer program product comprising a non-transitory computer readable storage medium having program instructions embodied therewith, the program instructions executable by a computer to cause the computer to perform a method comprising:
    learning, by a processor device, a set R of entity relation mining rules from a set K of known entity utterances uttered by known entities; and
    automatically recommending, by the processor device, extended utterances of the known entities from unrecognized ones of the known entities based on the set R;
    wherein said learning step comprises:
        replacing, in the set D of conversation logs, any of the known entity utterances from the set K that appear in the set D, by a respective representative utterance having a same meaning to form a set $D_1$ of unified conversation logs;

finding a set CS of chat log segments in the set $D_1$ which include at least two of the same utterances in the set $D_1$;

generating the set R of entity relation mining rules based on the set CS;

randomly selecting a subset $K_1$ from the set K;

for each of the respective representative utterance in the set $D_1$ that also occurs in the subset $K_1$, replacing the respective representative utterance with a corresponding original utterance from the set D to form a list $D_2$ of conversation logs;

removing the subset $K_1$ from the set K; and for each individual rule r in the set R, applying the individual rule r on the list $D_2$, checking a success rate of identifying utterance relations in the subset $K_1$, and removing the individual rule r from the set R if the success rate is below a rule success rate threshold.

12. The computer program product of claim 11, wherein said first replacing step comprises maintaining mapping information between each of the known entity utterances from the set K and the respective representative utterance therefor, and wherein said second replacing step replaces the respective representative utterance with the corresponding original utterance from the set D using the mapping information to form the list $D_2$.

13. The computer program product of claim 11, wherein the respective representative utterance having the same meaning is comprised in a set S of respective representative utterances having same meanings to expected words in the set D.

14. The computer program product of claim 11, wherein said recommending step comprises:

generating a set of word embeddings from the set D;

generating a set of phrase embeddings from the set of word embeddings;

identifying words and phrases having similar embedding vectors relative to a similarity threshold;

ranking candidate words and phrases based on character-level similarity; and recommending at least some of the candidate words and phrases as the extended utterances.

15. The computer program product of claim 14, wherein the method further comprises:

determining whether any of the candidate words and phrases match any of the rules in the set R;

recommending matching ones of the candidate words and phrases to a subject matter expert for verification; and discarding non-matching ones of the candidate words and phrases.

16. The computer program product of claim 15, wherein the word embedding and the phrase embeddings are used to obtain distributed representation vectors for both the known entities and unknown entities.

17. The computer program product of claim 11, wherein the set R is learned relative to a particular task, and wherein the known entity utterances specifically relate to the particular task.

18. The computer program product of claim 11, wherein the method further comprises controlling a processor-based machine to perform an action responsive to the extended utterance.

19. The computer program product of claim 18, wherein the processor-based machine is an Advanced Driver-Assistance System, and the extended utterance relates to controlling a trajectory of a vehicle.

20. A computer processing system for processing a set D of conversation logs, comprising:

a memory for storing program code; and a processor device for running the program code to learn a set R of entity relation mining rules from a set K of known entity utterances uttered by known entities; and automatically recommend extended utterances of the known entities from unrecognized ones of the known entities based on the set R;

wherein the set R is learned by:

replacing, in the set D of conversation logs, any of the known entity utterances from the set K that appear in the set D, by a respective representative utterance having a same meaning to form a set $D_1$ of unified conversation logs;

finding a set CS of chat log segments in the set $D_1$ which include at least two of the same utterances in the set $D_1$;

generating the set R of entity relation mining rules based on the set CS;

randomly selecting a subset $K_1$ from the set K;

for each of the respective representative utterance in the set $D_1$ that also occurs in the subset $K_1$, replacing the respective representative utterance with a corresponding original utterance from the set D to form a list $D_2$ of conversation logs;

removing the subset $K_1$ from the set K; and for each individual rule r in the set R, applying the individual rule r on the list $D_2$, checking a success rate of identifying utterance relations in the subset $K_1$, and removing the individual rule r from the set R if the success rate is below a rule success rate threshold.

* * * * *